(12) United States Patent
Jung

(10) Patent No.: US 11,282,308 B2
(45) Date of Patent: Mar. 22, 2022

(54) VEHICLE DIAGNOSTIC COMMUNICATION APPARATUS, SYSTEM INCLUDING THE SAME AND METHOD THEREOF

(71) Applicants: HYUNDAI MOTOR COMPANY, Seoul (KR); KIA MOTORS CORPORATION, Seoul (KR)

(72) Inventor: Ho Jin Jung, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 405 days.

(21) Appl. No.: 16/598,883

(22) Filed: Oct. 10, 2019

(65) Prior Publication Data

US 2020/0394853 A1 Dec. 17, 2020

(30) Foreign Application Priority Data

Jun. 17, 2019 (KR) .................. 10-2019-0071691

(51) Int. Cl.
| | |
|---|---|
| *H04L 67/12* | (2022.01) |
| *H04L 12/40* | (2006.01) |
| *G07C 5/08* | (2006.01) |
| *H04L 12/66* | (2006.01) |
| *H04L 43/0882* | (2022.01) |
| *G07C 5/10* | (2006.01) |
| *H04L 43/0852* | (2022.01) |

(52) U.S. Cl.
CPC ............ *G07C 5/085* (2013.01); *G07C 5/10* (2013.01); *H04L 12/40* (2013.01); *H04L 12/66* (2013.01); *H04L 43/0852* (2013.01); *H04L 43/0882* (2013.01); *H04L 67/12* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

2007/0291658 A1* 12/2007 Knapik ............... H04L 43/50
370/252
2021/0226843 A1* 7/2021 Bhaduri ............. H04L 47/32

* cited by examiner

*Primary Examiner* — Angela Nguyen
(74) *Attorney, Agent, or Firm* — Morgan, Lewis & Bockius LLP

(57) ABSTRACT

Disclosed are a vehicle diagnostic communication apparatus, a system including the same and a method thereof. The vehicle diagnostic communication apparatus may include a processor configured to automatically calculate a diagnostic time based on an controller-specific response time and vehicle network information when communicating with a vehicle, and storage configured to store the controller-specific response time and the vehicle network information.

20 Claims, 8 Drawing Sheets

|  | P2_server | PACKET MOVEMENT TIME (Packet Time) | GATEWAY DELAY (GW Delay) TIME | BUS LOAD DELAY (Latency) TIME |
|---|---|---|---|---|
| ECU A | RECEIVE AND UPDATE FROM CONTROLLER | UTILIZATION OF ADVANCE INPUT INFORMATION | UTILIZATION OF ADVANCE INPUT INFORMATION | UTILIZATION OF ADVANCE INPUT INFORMATION |
| ECU B | | | | |
| ECU C | | | | |

FIG. 6

|  | ① CONTROL-SPECIFIC RESPONSE WAIT TIME (P2_server) | ② PACKET MOVEMENT TIME (Packet Time) | ③ GATEWAY DELAY (GW Delay) TIME | ④ BUS LOAD DELAY (Latency) TIME |
|---|---|---|---|---|
| P2_client | | | | |
| ECU A | x | 15ms | CAN packet:260μs | X1:50μs | 50%:3.7ms |
| ECU B | y | 30ms | CAN-FD packet:394μs | X2:100μs | 80%:7ms |
| ECU C | z | 50ms | Ethernet packet:120μs | X1:10~100μs(Switch) | 10%:~10ms |

FIG. 7

VEHICLE DIAGNOSTIC COMMUNICATION APPARATUS, SYSTEM INCLUDING THE SAME AND METHOD THEREOF

CROSS-REFERENCE TO RELATED APPLICATION

The present application claims priority to and the benefit of Korean Patent Application No. 10-2019-0071691, filed on Jun. 17, 2019, which is incorporated herein by reference in its entirety.

TECHNICAL FIELD

The present disclosure relates to a vehicle diagnostic communication apparatus, a system including the same and a method thereof, and more particularly, to a technique for automatically calculating a diagnostic communication time.

BACKGROUND

The statements in this section merely provide background information related to the present disclosure and may not constitute prior art.

The P2_server, which belongs to the application layer timing parameter in the controller diagnostic standard (ISO 14229), is a performance requirement of the controller as a time taken to transmit a response message after receiving a request message from a vehicle diagnostic apparatus. The P2_client specifies the minimum value including the entire communication delay in the vehicle and P2_Server in a vehicle diagnostic system.

Therefore, a controller must transmit a response message within the P2_server time when a request is made from a vehicle diagnostic apparatus, and the vehicle diagnostic apparatus must wait for a response message for a time obtained by calculating all communication delays in the P2_server and the vehicle. When there is no response message, it is required to transmit the next diagnostic request message after waiting for the time.

Although the P2_server may be fixed to a certain maximum value (MAX) because the P2_server is the performance of the controller, the P2_client may be changed depending on the vehicle network environment (the number of gateways, a bus load, a message protocol delay, and the like), so that the value itself is ambiguous and does not specify the maximum value in the standard specification.

Accordingly, in the evaluation/service/production part in the vehicle diagnostic communication, a certain value is set without specific calculation as to how long the response of the controller is waited, and when a problem occurs, the diagnostic communication is performed in a scheme of extending the wait time, so that the diagnostic communication time may be delayed and the delay time is increased as the number of controllers is increased.

SUMMARY

The present disclosure provides a vehicle diagnostic communication apparatus capable of automatically calculating and applying an optimized diagnostic communication time corresponding to a network environment of a vehicle, a system including the same, and a method thereof.

The technical problems to be solved by the present inventive concept are not limited to the aforementioned problems, and any other technical problems not mentioned herein will be clearly understood from the following description by those skilled in the art to which the present disclosure pertains.

In one form of the present disclosure, a vehicle diagnostic communication apparatus includes a processor that automatically calculates a diagnostic time based on an controller-specific response time and vehicle network information when communicating with a vehicle, and storage that stores the in-vehicle controller-specific response wait time and the vehicle network information.

The storage may store a diagnostic communication time table in which an controller-specific diagnostic communication time is matched with each vehicle.

The vehicle network information may include at least one of a packet movement time corresponding to a controller-specific protocol, a domain-specific bus load, or a gateway delay time.

The packet movement time corresponding to the controller-specific protocol may be calculated based on a protocol-specific communication speed and a total message length of at least one of controller area network (CAN) communication, CAN-flexible data rate (CAN-FD) communication or Ethernet communication.

The domain-specific bus load may include a type and a number of domain-specific controllers, a vehicle type, and bus load information corresponding to CAN ID priority.

The gateway delay time may include a delay time corresponding to a number of gateways and the gateway delay time.

The processor may transmit a diagnosis initialization message to a plurality of controllers in the vehicle through a diagnostic session control service when a connector for initial diagnostic communication is connected to the vehicle.

The processor may receive a response message to the diagnosis initialization message from a plurality of controllers and receive controller-specific response times information included in the response message.

The processor may determine whether the processor stores controller-specific vehicle network information is stored in advance after the diagnosis initialization message is transmitted.

The processor may calculate the diagnostic time by using the controller-specific vehicle network information and the controller-specific response time information, and update a diagnostic time table when the controller-specific vehicle network information is stored in advance.

The processor may perform diagnostic communication with the vehicle based on the updated diagnostic time table.

The processor may perform a diagnostic communication with the vehicle based on a diagnostic time previously set when the controller-specific vehicle network information is not stored in advance.

The processor may calculate the diagnostic time by summing up the controller-specific response time, a packet movement time corresponding to a controller-specific protocol, a domain-specific bus load, or a gateway delay time.

In another form of the present disclosure, a system includes a vehicle diagnostic communication apparatus that automatically calculates a diagnostic time based on an controller-specific response time and vehicle network information to perform a diagnostic communication for the calculated diagnostic time when communicating with an in-vehicle controller, and the in-vehicle controller that transmits a diagnosis response message to the vehicle diagnostic communication apparatus within a preset response wait time when receiving a diagnosis request message is received from the vehicle diagnostic communication apparatus.

In another form of the present disclosure, a vehicle diagnostic communication method includes preparing a diagnostic communication with an in-vehicle controller, transmitting a diagnosis initialization message, receiving a response message for the diagnosis initialization message from the in-vehicle controller, and calculating a diagnostic time based on an in-vehicle controller-specific response time included in the response message and vehicle network information stored in advance.

The vehicle diagnostic communication method may further include performing the diagnostic communication with the in-vehicle controller based on the calculated diagnostic communication time.

The calculating of the diagnostic time may include calculating the diagnostic time by summing up a controller-specific response time, a packet movement time according to a controller-specific protocol, a domain-specific bus load, and a gateway delay time.

The calculating of the diagnostic time may include calculating the diagnostic time by using controller-specific vehicle network information and controller-specific response time information, and updating a diagnostic time table when the controller-specific vehicle network information is stored in advance.

The calculating of the diagnostic time may include performing a diagnostic communication with the vehicle based on a diagnostic time previously set when the controller-specific vehicle network information is not stored in advance.

The vehicle diagnostic communication method may further include storing in advance a packet movement time corresponding to a controller-specific protocol, a domain-specific bus load, and a gateway delay time as the vehicle network information.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6 is an exemplary view illustrating a diagnostic communication table in one form of the present disclosure;

FIG. 7 is a table illustrating a method of obtaining parameters for calculating a diagnostic communication time in one form of the present disclosure.

Figure 1:
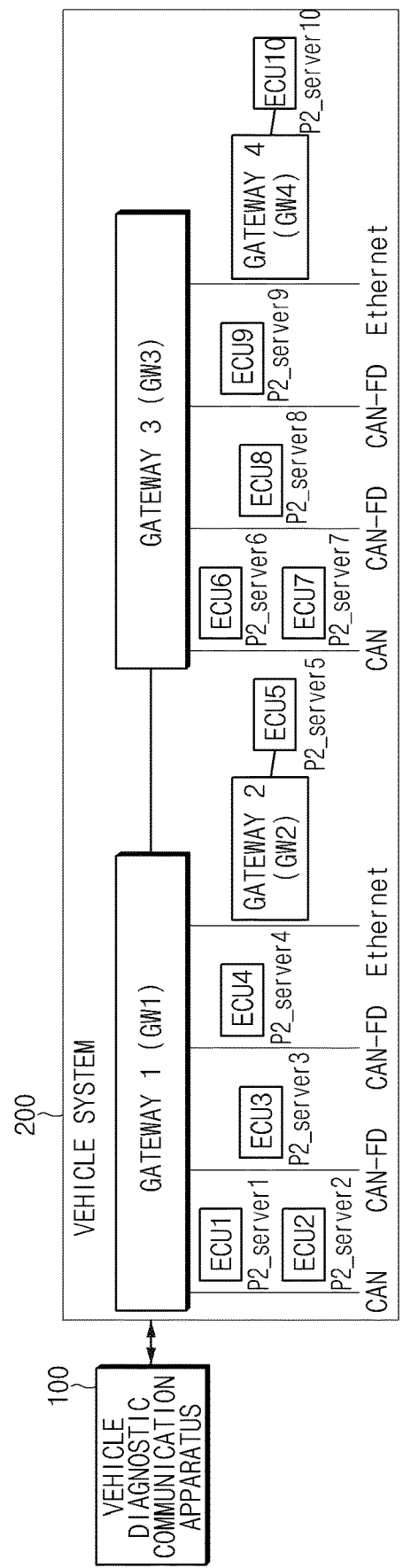
FIG. 1 is a block diagram illustrating the configuration of a vehicle system connected to a vehicle diagnostic communication apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a technique for calculating a diagnostic communication time P2_server that belongs to an application layer timing parameter in the diagnostic standard specification (ISO 14229).

Hereinafter, some forms of the present disclosure will be described in detail with reference to FIGS. 1 to 8.

FIG. 1 is a block diagram illustrating the configuration of a vehicle system connected to a vehicle diagnostic communication apparatus in some forms of the present disclosure.

Referring to FIG. 1, a vehicle system in some forms of the present disclosure may include at least one gateway GW1 to GW4 and at least one controller ECU1 to ECU10 that perform communication for vehicle diagnosis with a vehicle diagnostic communication apparatus 100.

In this case, the vehicle diagnostic communication apparatus 100 and each of the controllers ECU 1 to ECU 10 in the vehicle system may perform a controller area network (CAN) communication, a CAN with flexible data rate (CAN-FD) communication, or an Ethernet communication.

When diagnosis-communicating with a vehicle, the vehicle diagnostic communication apparatus 100 may automatically calculate a diagnostic communication time based on an in-vehicle controller-specific response wait time and vehicle network information.

In this case, the vehicle network information may include at least one of a packet movement time according to a controller-specific protocol, a domain-specific bus load, or a gateway delay time.

The packet movement time according to the controller-specific protocol is calculated based on a protocol-specific communication speed and a total message length of at least one of the CAN communication, the CAN-FD communication or the Ethernet communication. In addition, the domain-specific bus load may include bus load information based on a kind and the number of in-vehicle domain-specific controllers, a vehicle type, and CAN ID priority. In addition, the gateway delay time may include a delay time corresponding to the number of gateways and a delay time of the gateway itself.

Figure 2:
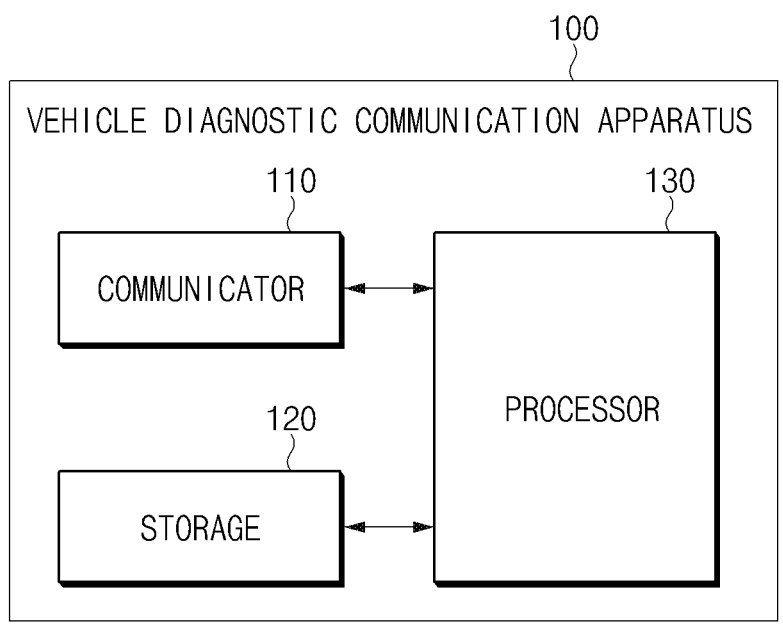
FIG. 2 is a block diagram illustrating a detailed configuration of a vehicle diagnostic communication apparatus in one form of the present disclosure.

FIG. 2 is a block diagram illustrating a detailed configuration of a vehicle diagnostic communication apparatus in some forms of the present disclosure.

The vehicle diagnostic communication apparatus 100 may include a communicator 110, storage 120, and a processor 130.

The communicator 110, which is a hardware device implemented with various electronic circuits for performing in-vehicle communication through CAN communication, LIN communication, and the like, may communicate with an in-vehicle controller, a diagnostic device outside the vehicle, and the like in the present disclosure.

The storage 120 may store a diagnostic communication time table in which the each in-vehicle controller-specific response waiting time, the vehicle network information, the vehicle-specific diagnostic communication time, and the in-vehicle controller-specific diagnostic communication time are matched with each other. The storage 120 may include at least one type of a storage medium of memories of a flash memory type, a hard disk type, a micro type, a card type (e.g., a secure digital (SD) card or an extreme digital (XD) card), and the like, and a random access memory (RAM), a static RAM (SRAM), a read-only memory (ROM), a programmable ROM (PROM), an electrically erasable PROM (EEPROM), a magnetic memory (MRAM), a magnetic disk, or an optical disk type memory.

The processor 130 may be electrically connected to the communicator 110 and the storage 120, may electrically control each configuration, and may be an electric circuit that executes software commands. The processor 130 may perform various data processing and calculations described below.

The processor 130 may automatically calculate the diagnostic communication time based on the in-vehicle controller-specific response wait time and the vehicle network information when diagnosis-communicating with the vehicle.

When the connector for initial diagnostic communication is connected to the vehicle, the processor 130 may transmit a diagnosis initialization message to all controllers in the vehicle through the diagnostic session control service, receive the response message to the diagnosis initialization message from all the controllers, receive the controller-specific response wait time information included in the response message, and store the controller-specific response wait time information in the storage 120.

After the diagnosis initialization message is transmitted, the processor 130 may determine whether the controller-specific vehicle network information is stored in the storage 120. When the controller-specific vehicle network information is stored in advance, the processor 130 may calculate the diagnostic communication time by using the controller-specific vehicle network information stored in advance and the controller-specific response wait time information received from the controller, and may update the diagnostic communication time table.

Thus, the processor 130 may perform the diagnostic communication with the vehicle based on the updated diagnostic communication time. To the contrary, when the controller-specific vehicle network information is not previously stored, the processor 130 may perform the diagnostic communication with the vehicle based on a preset diagnostic communication time.

The processor 130 may calculate the diagnostic communication time by summing up the controller-specific response wait time, the packet movement time according to the controller-specific protocol, the domain-specific bus load, and the gateway delay time.

Hereinafter, a method of calculating the diagnostic communication time will be described in detail with reference to equation 1 and tables 1 to 4.

The diagnostic communication time P2_client is a time taken for the controller to send a response message after receiving the request message from the vehicle diagnostic communication apparatus 100. To set the diagnostic communication time, the vehicle diagnostic communication apparatus 100 may use the controller-specific response wait time P2_server, the packet movement time according to the controller-specific protocol, the domain-specific bus load, the number of gateways, and the gateway delay time. The vehicle diagnostic communication apparatus 100 may calculate the diagnostic communication time P2 client as expressed in the following Equation 1.

$$P2_{\_client} = P2_{\_server} + \text{Packet movement time} + \text{Gateway delay time} + \text{Bus load delay time}$$

In this case, the controller-specific response wait time P2 server, which is a time taken for the controller to transmit the response message to the diagnostic request message after the controller receives the diagnosis request message, may be set to the unique performance requirement maximum value (MAX value) that the controller has.

The controller-specific response wait time P2 server may be checked through the Diagnostic Session Control (0x10) service among diagnostic services as shown in the following Table 1. The vehicle diagnostic communication apparatus 100 transmits the initial diagnosis message to all the controllers (Functional Addressing: 0x7DF) before starting diagnostic communication with the controller to inform the start of diagnosis (ex, 10 01). In this case, all the controllers transmit the response wait time P2_Server and P2*_Server value together with the positive response corresponding to the Session Parameter Record value shown in the following Table 2 below.

In this case, the vehicle diagnostic communication apparatus 100 stores this information in each controller CAN ID matching table.

TABLE 1

| A_Data byte | Parameter Name | Cvt | Byte Value | Mnemonic |
|---|---|---|---|---|
| #1 | DiagnosticSessionControl Response SID | M | 0x50 | DSCPR |
| #2 | Sub-function=[diagnosticSessionType] | M | 0x00-0xFF | LEV_DS |
| #3 | sessionParameterRecord[ ] #1=[data#1 | M | 0x00-0xFF | SPREC_DATA_1 |

TABLE 1-continued

| A_Data byte | Parameter Name | Cvt | Byte Value | Mnemonic |
|---|---|---|---|---|
| . | . | . | . | . |
| . | . | . | . | . |
| . | . | . | . | . |
| #6 | data#4 | M | 0x00-0xFF | DATA_m |

TABLE 2

| Byte pos. in record | Description | Cvt | Byte Value | Mnemonic |
|---|---|---|---|---|
| #1 | sessionParameterRecord[ ] = [P2_server(high byte) | M | 0x00-0xFF | SPREC_P2SMH |
| #2 | P2_server(low byte) | M | 0x00-0xFF | P2SML |
| #3 | P2*_server(high byte) | M | 0x00-0xFF | P2ESMH |
| #4 | P2*_server(low byte) | M | 0x00-0xFF | P2ESML |

The packet movement time according to the controller-specific protocol is a type of communication protocol used in a vehicle such as CAN, CAN-FD, Ethernet, or the like and the communication speed corresponding to the type. The domain-specific bus load is information about how much bus load a domain-specific message occupies.

Depending on the protocol used in the vehicle, the time taken to pass a message, that is, the time taken to move the message from the controller to the controller, is varied. The following Table 3 shows the message movement time considering the communication speed according to each protocol. The CAN protocol basically consists of an 8-byte data payload, and includes, in the forward and backward directions of the payload, an arbitration field for determining the priority of the message, a control field for determining the data size, a CRC field for identifying the data transmission, and the like, so that the total data has a size of about 133 bits.

The CAN-FD protocol, which is a protocol developed to overcome the limitations of 8-byte data, may extend the existing 8-byte data size up to 64 bytes and use a data rate up to 8 Mbps. In this case, the CAN-FD protocol uses 64 bytes of data and measures the message length based on the 2 Mbps that is most commonly used in OEMs. Recently, as the importance of connectivity has increased, a considerable amount of data has been required in a vehicle. Thus, the use of the Ethernet protocol is under consideration in a vehicle, and some OEMs are applying it to mass production. In the present disclosure, the measurement is based on a full packet standard of about 1518 bytes, 12144 bits, and 100 Mbps which is the most used in vehicles.

TABLE 3

| Communication protocol | Total length of message | Communication speed | Packet movement time |
|---|---|---|---|
| CAN | 133 bit | 500 kbps | 133/500k = 266 us |
| CAN-FD ⋇Assumption of using 64 byte Data/2 Mbps | 69 bit (not data)/512 bit (data) | 500 kbps (Not data) + 2 Mbps (data) | 69/500k + 512/2M = 394 us |
| Ethernet ⋇Assumption of using 100 Mbps | 1518 byte (Full data reference) = 12144 bit | 100 Mbps | 12144/100M = 121 us |

As shown in Table 3, when the CAN protocol is used, the packet movement time is 266 μS. When the CAN-FD protocol is used, the packet movement time is 394 μS. When the Ethernet protocol is used, the packet movement time may be set to 121 μS. Such a packet movement speed may be a value determined depending on each protocol.

The bus load of a vehicle means a traffic amount which shows how much network bus occupies in one domain. Each OEM regulates bus load numbers to prevent delays in communication between controllers. Systems in one vehicle include a number of domains. For example, the in-vehicle domain may include a power train series domain to which an engine controller, a transmission controller and the like belong, a multimedia series domain such as a navigation, an amplifier, a monitor, and the like, and a body series domain that controls a head lamp, a power supply, and the like, and the like. Because the types of controllers for each domain are different from each other, the bus loads may also have different values and vary depending on the vehicle model. For example, in light and small vehicles, the number of controllers is relatively small, so they have a low bus load. Meanwhile, in the case of a large vehicle, many controllers are equipped, and there are many controllers cooperating (mutually inter-domain routed messages) with each other, so that the bus load is high.

The following Table 4 shows the result of measuring the latency time for a message having a transmission period of 10 ms due to the bus load in a large vehicle.

A message having a high ID priority means an ID message of which CAN ID is located at the front end like 0x000 or 0x100 and has a relatively high priority (e.g., a power train series control message, and the like), and a message having a lower ID priority means an ID message of which CAN ID is located at the rear end like 0x400 or 0x500 and has a lower priority.

Because only one message can be transmitted on one bus line due to the characteristics of the CAN protocol, when two messages collide at a certain time point, a message having a higher ID priority may win over the competition, and the low priority message continues to wait until the bus is in an idle state. In the case of the diagnosis message referred to in the present disclosure, the message is fixed to 0x700, so that the priority is relatively very low compared to a general control message. Therefore, the bus load is greatly affected. In the present disclosure, an approximate latency time may be calculated by using a control message measurement value having a transmission period of 10 ms.

TABLE 4

| Classification | Latency according to bus load (ms) | | | | | | |
|---|---|---|---|---|---|---|---|
|  | 50% | 60% | 70% | 80% | 90% | 100% | |
| High ID priority message | 0.95 | 1.01 | 1.26 | 1.24 | 1.10 | 1.30 | Control message having transmission period of 10 ms |
| Low ID priority message | 3.7 | 3.53 | 4.69 | 7.00 | 7.69 | 17.39 | |

The number of gateways is information on how many gateways are present from the vehicle diagnostic communication apparatus 100 to its controller, and the gateway delay time means its own delay time occurring at the gateway to route the message.

As the bus load of the vehicle increases, all the controllers cannot be connected to one domain, and thus the domains are classified according to the characteristics of the controller. Accordingly, a gateway for routing messages between domains is inevitably installed in a vehicle, and the number of gateways is increased because the local network is additionally operated. As the number of gateways increases, because messages have to go through a single controller, a propagation delay is generated, and an additional delay occurs in the gateway itself. For example, the delay time of the gateway itself may be set to 50 μs.

As described above, in some forms of the present disclosure, when the vehicle diagnostic communication apparatus 100 diagnosis-communicates with a vehicle, the vehicle diagnostic communication apparatus 100 receives the response wait time P2_server from each controller by using a diagnosis initialization message (Diagnostic session control service, 10 hex). The protocol-specific packet movement time may be stored in advance in the storage 120 of the vehicle diagnostic communication apparatus 100 as a fixed value. In addition, the number of gateways, its own delay time, and the bus load delay time together with the number of gateways existing between the controller and the external vehicle diagnostic communication apparatus 100 and the bus load delay time of the domain to which the controller belongs may be input and stored in the vehicle diagnostic communication apparatus 100 when diagnostic information of each controller is input by OEM.

In addition, the vehicle diagnostic communication apparatus 100 may calculate the diagnostic communication time for each controller as it is in the existing sequence without any additional request operations, and store the calculated diagnostic communication time in the diagnostic communication time table for each controller.

Figure 3:
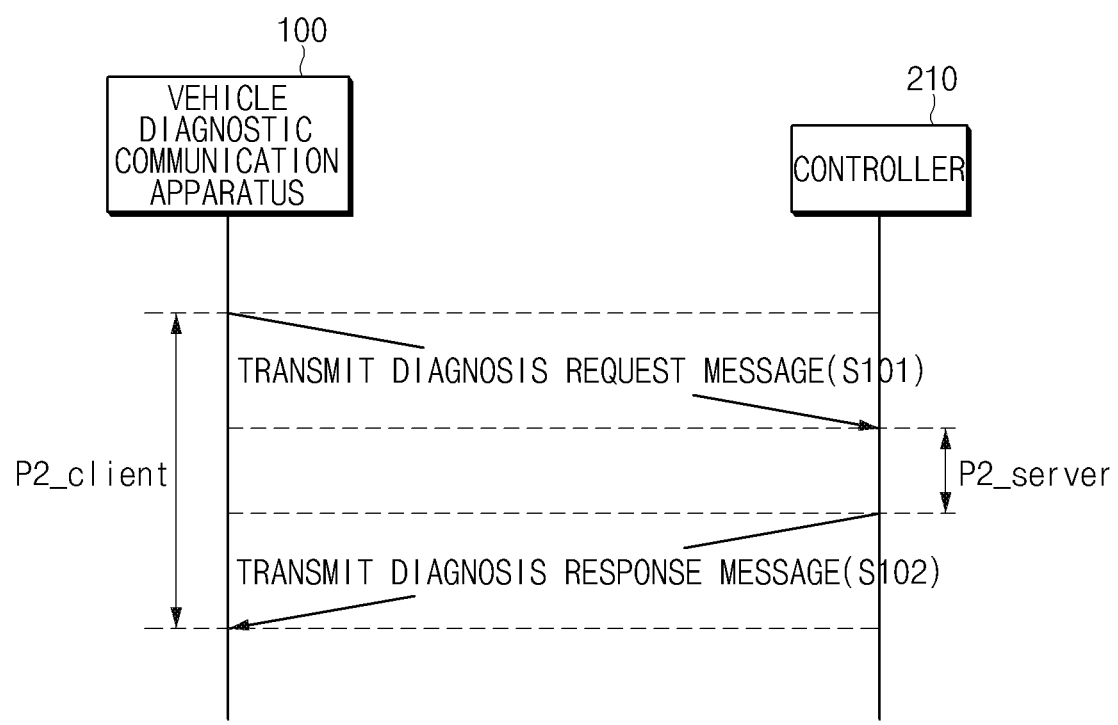
FIG. 3 is a flowchart illustrating a vehicle diagnostic communication method in one form of the present disclosure.

Hereinafter, a vehicle diagnostic communication method in some forms of the present disclosure will be described with reference to FIG. 3. FIG. 3 is a flowchart illustrating a vehicle diagnostic communication method in some forms of the present disclosure.

Referring to FIG. 3, when the vehicle diagnostic communication apparatus 100 transmits a diagnosis request message for diagnostic communication to a controller 210 in the vehicle system in operation S101, the controller 210 transmits a diagnosis response message within the response wait time P2_server in operation S102.

In this case, the time it takes for the vehicle diagnostic communication apparatus 100 to receive the diagnosis response message after requesting the diagnosis request message is called the diagnostic communication time P2_client.

The vehicle diagnostic communication apparatus 100 waits for a response message during the diagnostic communication time P2_client immediately after requesting the diagnosis request message. When the response message is not received even after the diagnostic communication time P2_client elapses, the vehicle diagnostic communication apparatus 100 may retransmit the diagnosis request message or transmit the diagnosis request message to another controller. In this case, the diagnostic communication time P2_client may be determined as the sum of the time to transfer the diagnosis request message to the controller ECU 5, the time to receive the diagnosis response message from the controller ECU 5, and the response wait time P2 server of the controller ECU5.

FIG. 3 illustrates, as an example, a process of performing diagnostic communication between the vehicle diagnostic communication apparatus 100 outside a vehicle and one controller 210 in a vehicle system without a gateway.

However, as the bus load of the vehicle increases, all the controllers cannot be connected to one domain, so that the domains may be classified according to the characteristics of the controller. Accordingly, a gateway for routing messages between domains is inevitably installed in the vehicle.

However, the number of gateways is gradually increasing while operating in a local network in a vehicle. As the number of gateways increases, because the number of gateways to be passed increases, a propagation delay may be generated and a delay of the gateway itself may be further generated.

Figure 4:
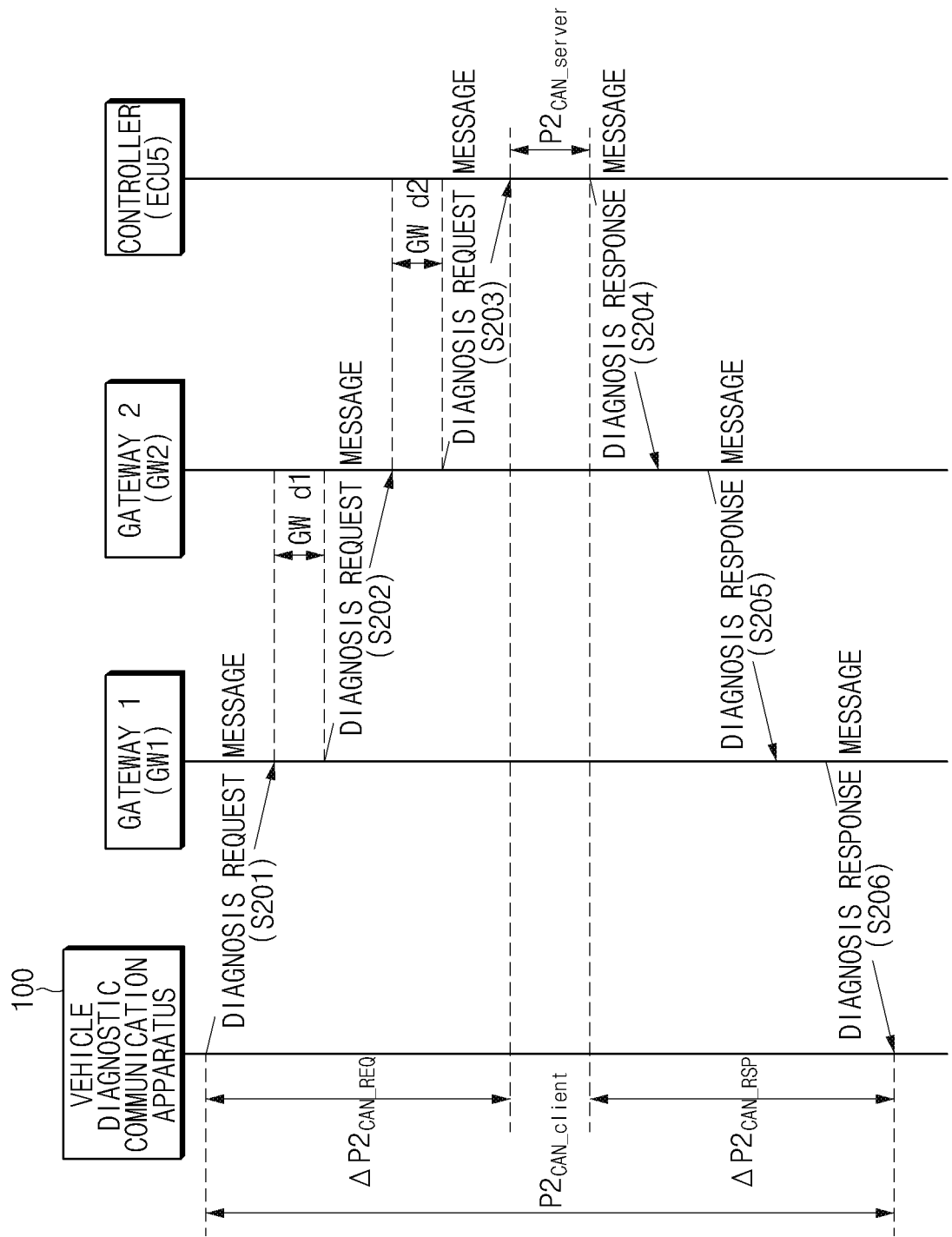
FIG. 4 is a flowchart illustrating a vehicle diagnostic communication method in case where there exists at least one gateway in one form of the present disclosure.

Hereinafter, a vehicle diagnostic communication method in case where there exists at least one gateway in some forms of the present disclosure will be described with reference to FIG. 4. FIG. 4 is a flowchart illustrating a vehicle diagnostic communication method in case where there exists at least one gateway in some forms of the present disclosure.

In FIG. 4, as an example, the case where the vehicle diagnostic communication apparatus 100 of FIG. 1 performs diagnostic communication with the controller ECU 5 will be described.

When the vehicle diagnostic communication apparatus 100 transmits a diagnosis request message for diagnostic communication to the vehicle system in operation S201, the gateway '1' GW1 transfers the diagnosis request message to the gateway '2' GW2 in operation S202. Thus, the gateway '2' GW2 transfers the diagnosis request message to the controller ECU5 again in operation S203. Therefore, the diagnosis request message passes through the gateway '1' and the gateway '2', so that the gateway delays GWd1 and GWd2 are generated.

In operation S204, the controller ECU5 that has received the diagnosis request message transmits the diagnosis response message within the response wait time P2 server.

In operation S205, the gateway 2 (GW2) that has received the diagnosis response message transmitted from the controller ECU5 transfers the diagnosis response message to the gateway '1' CGW1.

In operation S206, the gateway '1' GW1 transmits the diagnosis response message to the vehicle diagnostic communication apparatus 100.

In this case, the time it takes for the vehicle diagnostic communication apparatus 100 to receive the diagnosis response message after requesting the diagnosis request message is called the diagnostic communication time P2_client.

The vehicle diagnostic communication apparatus 100 waits for a response message during the diagnostic communication time P2_client immediately after requesting the diagnosis request message. When the response message is not received even after the diagnostic communication time P2_client elapses, the vehicle diagnostic communication apparatus 100 may retransmit the diagnosis request message or transmit the diagnosis request message to another controller.

In this case, the diagnostic communication time P2_client may be determined as the sum of the time $\Delta P2_{CAN\_REQ}$ to transfer the diagnosis request message to the controller ECU 5, the time $\Delta P2_{CAN\_RSP}$ to receive the diagnosis response message from the controller ECU 5, and the response wait time P2 server of the controller ECU5.

Figure 5:
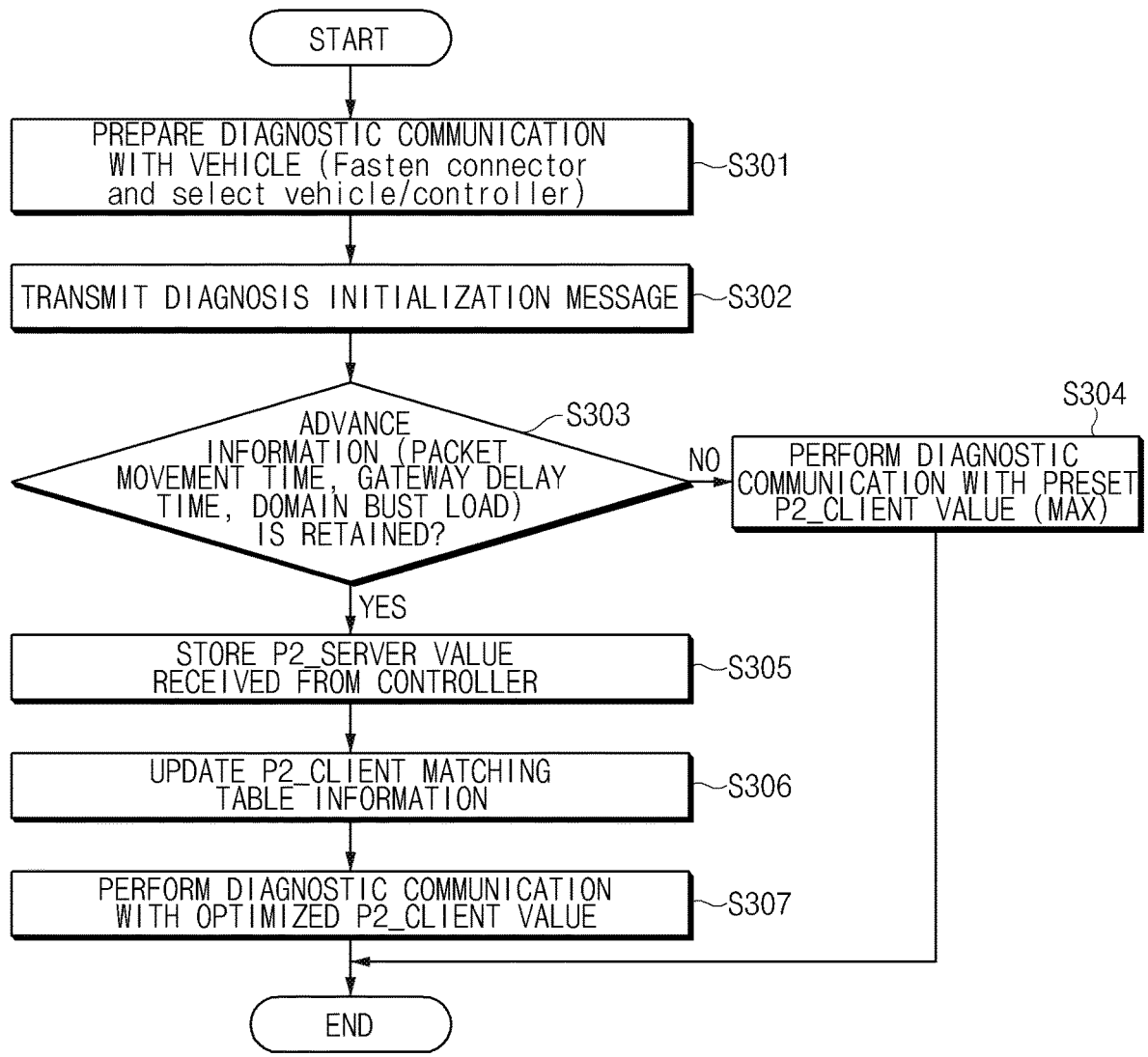
FIG. 5 is a flowchart illustrating a method of operating a vehicle diagnostic communication apparatus in one form of the present disclosure.

Hereinafter, a method of operating a vehicle diagnostic communication apparatus in some forms of the present disclosure will be described with reference to FIG. 5. FIG. 5 is a flowchart illustrating a method of operating a vehicle diagnostic communication apparatus in some forms of the present disclosure.

Hereinafter, it is assumed that the vehicle diagnostic communication apparatus 100 of FIG. 1 performs the process of FIG. 5. In addition, in the description of FIG. 5, it can be understood that the operations described as being performed by an apparatus are controlled by the processor 130 of the vehicle diagnostic communication apparatus 100.

Referring to FIG. 5, in operation S301, the vehicle diagnostic communication apparatus 100 prepares the diagnostic communication with the vehicle system. In this case, the preparation for diagnostic communication means selecting a vehicle and a controller to be subjected to connector connection and diagnostic communication for diagnostic communication with an initial vehicle.

In operation S302, the vehicle diagnostic communication apparatus 100 transmits a diagnosis initialization message to all controllers (Functional Request) in accordance with the diagnostic communication standard.

The vehicle diagnostic communication apparatus 100 checks whether the information for calculating the diagnostic communication time P2 client is stored in advance in operation S303. When the advance information is not stored, the vehicle diagnostic communication apparatus 100 may perform diagnostic communication with the previously set diagnostic communication time P2_client_PRE in operation S304. In this case, the advance information may include information about the protocol-specific packet movement time, the controller-specific delay time, and the bus load delay time. As shown in FIG. 6, the advance information may be received from the controller and updated or the information input in advance may be utilized. FIG. 6 is a table illustrating a method of obtaining parameters for calculating a diagnostic communication time in some forms of the present disclosure. That is, the vehicle diagnostic communication apparatus 100 may receive and store the response wait time P2_server from each controller, and store the information about the protocol-specific packet movement time, the controller-specific delay time, and the bus load delay time input in advance.

In this case, the controller-specific response wait time P2_server is the time it takes for the controller to receive a diagnosis request message and transmit the response message to it, and may be set to the unique performance requirement maximum value (MAX value) that the controller has. The packet movement time according to the controller-specific protocol is a communication speed depending on the type of the communication protocol used in the vehicle, such as CAN, CAN-FD, Ethernet, or the like, and the communication speed corresponding to the protocol type. The domain-specific bus load is information about how much bus load a domain-specific message occupies. The number of gateways is information about how many gateways are from the vehicle diagnostic device to its own controller. The gateway delay time refers to its own delay time that occurs at the gateway to route a message.

Meanwhile, when the advance information is not stored, the response wait time P2_server received from the controller ECU5 is stored in operation S305, and the diagnostic communication time P2_client is calculated by using the response wait time P2_server to update the diagnostic communication time table in operation S306. In this case, the diagnostic communication time table is as shown in FIG. 7. FIG. 7 is an exemplary view of a diagnostic communication time table in some forms of the present disclosure. Referring to FIG. 7, the diagnostic communication time table stores the advance information for controllers x, y and z, and includes information about the controller-specific diagnostic communication time P2_client, the controller-specific response wait time, the protocol-specific packet movement time, and the bus load delay time, and the like.

As described above, because the vehicle diagnostic communication apparatus 100 stores the diagnostic communication time table corresponding to each vehicle model and each controller, when receiving the response wait time P2_server from the controller, the vehicle diagnostic communication apparatus 100 automatically calculates and stores the diagnostic communication time P2_client by using the previously stored advance information (e.g., the information about the protocol-specific packet movement time, the controller-specific delay time, and the bus load delay time).

Thus, the vehicle diagnostic communication apparatus 100 stores the diagnostic communication time P2_client optimized for each controller, so that the vehicle diagnostic communication apparatus 100 transmits the next diagnostic message after waiting for the diagnostic communication time P2_client for the message requiring the response or the message not requiring the response. Thus, in the present disclosure, it is possible to obtain the diagnostic communication time P2_client by optimizing an ambiguous reference of P2_client described in the standard specification corresponding to each vehicle and the architecture structure.

Thereafter, the vehicle diagnostic communication apparatus 100 may perform diagnostic communication by using the calculated diagnostic communication time P2_client in operation S307.

As described above, in some forms of the present disclosure, the diagnostic communication time P2_client, which is optimized for each vehicle and network and not a previously set value, is automatically generated without additional command, such that the vehicle diagnostic communication apparatus 100 may perform the diagnostic communication with the vehicle controller without interruption of the diagnostic session or additional delay time.

Figure 8:
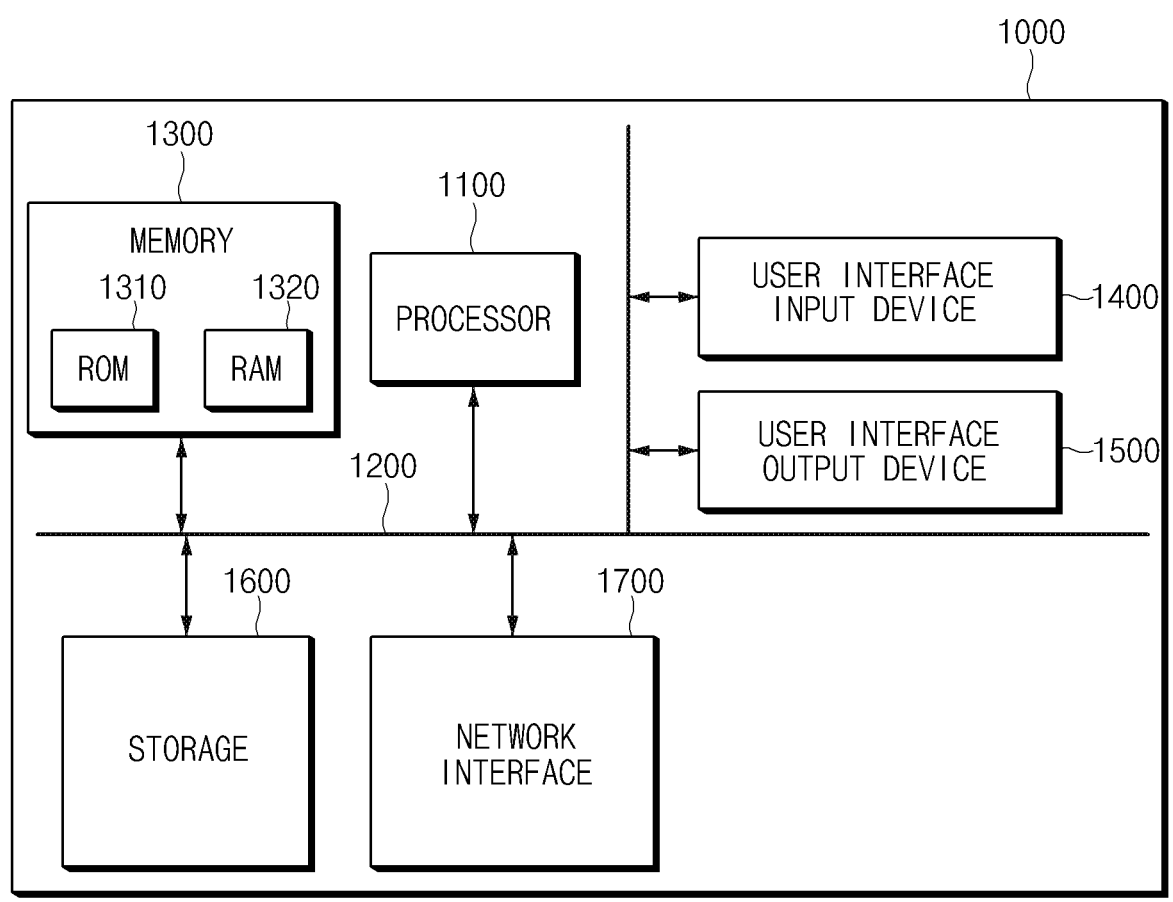
FIG. 8 is a view illustrating a computing system in one form of the present disclosure.

FIG. 8 is a view illustrating a computing system in some forms of the present disclosure.

Referring to FIG. 8, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technique may automatically calculate and apply a diagnostic communication time optimized for a network environment of a vehicle.

In addition, various effects that are directly or indirectly understood through the present disclosure may be provided.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle diagnostic communication apparatus comprising:
   a processor configured to automatically calculate a diagnostic time based on controller-specific response time and vehicle network information when communicating with a vehicle; and
   storage configured to store the controller-specific response times and the vehicle network information.

2. The vehicle diagnostic communication apparatus of claim 1, wherein the storage is configured to:
   store a diagnostic time table in which an controller-specific diagnostic time is matched with each vehicle.

3. The vehicle diagnostic communication apparatus of claim 1, wherein the vehicle network information comprises at least one of a packet movement time corresponding to a controller-specific protocol, a domain-specific bus load, or a gateway delay time.

4. The vehicle diagnostic communication apparatus of claim 3, wherein the packet movement time corresponding to the controller-specific protocol is calculated based on a protocol-specific communication speed and a total message length of at least one of a controller area network (CAN) communication, a CAN-flexible data rate (CAN-FD) communication or an Ethernet communication.

5. The vehicle diagnostic communication apparatus of claim 3, wherein the domain-specific bus load comprises a type and a number of domain-specific controllers, a vehicle type, and bus load information corresponding to CAN ID priority.

6. The vehicle diagnostic communication apparatus of claim 3, wherein the gateway delay time comprises a delay time corresponding to a number of gateways and the gateway delay time.

7. The vehicle diagnostic communication apparatus of claim 1, wherein the processor is configured to:
   transmit a diagnosis initialization message to a plurality of controllers in the vehicle through a diagnostic session control service when a connector for initial diagnostic communication is connected to the vehicle.

8. The vehicle diagnostic communication apparatus of claim 7, wherein the processor is configured to:
   receive a response message to the diagnosis initialization message from the plurality of controllers; and
   receive controller-specific response time information included in the response message.

9. The vehicle diagnostic communication apparatus of claim 7, wherein the processor is configured to:
   determine whether controller-specific vehicle network information is stored in advance after the diagnosis initialization message is transmitted.

10. The vehicle diagnostic communication apparatus of claim 9, wherein the processor is configured to:
    calculate the diagnostic time by using the controller-specific vehicle network information and the controller-specific response time information; and
    update a diagnostic time table when the controller-specific vehicle network information is stored in advance.

11. The vehicle diagnostic communication apparatus of claim 10, wherein the processor is configured to:
    perform a diagnostic communication with the vehicle based on the updated diagnostic time table.

12. The vehicle diagnostic communication apparatus of claim 9, wherein the processor is configured to:
    perform a diagnostic communication with the vehicle based on a diagnostic time previously set when the controller-specific vehicle network information is not stored in advance.

13. The vehicle diagnostic communication apparatus of claim 1, wherein the processor is configured to:
    calculate the diagnostic time by summing up the controller-specific response time, a packet movement time corresponding to a controller-specific protocol, a domain-specific bus load, and a gateway delay time.

14. A system comprising:
    a vehicle diagnostic communication apparatus configured to automatically calculate a diagnostic time based on an controller-specific response time and vehicle network information to perform a diagnostic communication for the calculated diagnostic time when communicating with an in-vehicle controller; and
    the in-vehicle controller configured to transmit a diagnosis response message to the vehicle diagnostic communication apparatus within a preset response time when a diagnosis request message is received from the vehicle diagnostic communication apparatus.

15. A vehicle diagnostic communication method comprising:
    preparing a diagnostic communication with an in-vehicle controller;
    transmitting a diagnosis initialization message;
    receiving a response message for the diagnosis initialization message from the in-vehicle controller; and calculating a diagnostic time based on an in-vehicle controller-specific response time included in the response message and vehicle network information stored in advance.

16. The vehicle diagnostic communication method of claim 15, wherein the method further comprises:

performing the diagnostic communication with the in-vehicle controller based on the calculated diagnostic time.

17. The vehicle diagnostic communication method of claim 15, wherein calculating the diagnostic time comprises:

calculating the diagnostic time by summing up a controller-specific response time, a packet movement time according to a controller-specific protocol, a domain-specific bus load, and a gateway delay time.

18. The vehicle diagnostic communication method of claim 15, wherein calculating the diagnostic time comprises:

calculating the diagnostic time by using controller-specific vehicle network information and controller-specific response time information; and updating a diagnostic time table when the controller-specific vehicle network information is stored in advance.

19. The vehicle diagnostic communication method of claim 16, wherein calculating the diagnostic time comprises:

performing a diagnostic communication with the vehicle based on a diagnostic time previously set when the controller-specific vehicle network information is not stored in advance.

20. The vehicle diagnostic communication method of claim 15, wherein the method further comprises:

storing in advance a packet movement time corresponding to a controller-specific protocol, a domain-specific bus load, and a gateway delay time as the vehicle network information.

* * * * *